United States Patent
Tian et al.

(10) Patent No.: US 12,452,242 B2
(45) Date of Patent: Oct. 21, 2025

(54) CLOUD PLATFORM BINDING METHOD AND SYSTEM FOR INTERNET OF THINGS CARD, AND DEVICE AND MEDIUM

(71) Applicant: E Surfing IoT Co., Ltd, Jiangsu (CN)

(72) Inventors: Bin Tian, Jiangsu (CN); Ming Zhu, Jiangsu (CN); Xia Ding, Jiangsu (CN); Shijie Wang, Jiangsu (CN); Xinglong Ben, Jiangsu (CN); Yu Zhang, Jiangsu (CN); Qiangrui Chen, Jiangsu (CN)

(73) Assignee: E Surfing IoT Co., Ltd, Nanjing (CN)

( * ) Notice: Subject to any disclaimer, the term of this patent is extended or adjusted under 35 U.S.C. 154(b) by 64 days.

(21) Appl. No.: 18/699,608

(22) PCT Filed: Dec. 24, 2021

(86) PCT No.: PCT/CN2021/141154
§ 371 (c)(1),
(2) Date: Apr. 9, 2024

(87) PCT Pub. No.: WO2023/056713
PCT Pub. Date: Apr. 13, 2023

(65) Prior Publication Data
US 2024/0406171 A1    Dec. 5, 2024

(30) Foreign Application Priority Data
Oct. 9, 2021   (CN) .......................... 202111174913.1

(51) Int. Cl.
G06F 7/04    (2006.01)
H04L 9/40    (2022.01)
G16Y 40/50   (2020.01)

(52) U.S. Cl.
CPC .......... H04L 63/0876 (2013.01); H04L 63/06 (2013.01); G16Y 40/50 (2020.01)

(58) Field of Classification Search
CPC ........ G06F 21/335; G06F 21/44; G06F 21/60; G06F 21/62; H04L 9/08; H04L 9/0866; H04L 63/0876; H04L 63/06; H04W 12/48
See application file for complete search history.

(56) References Cited

U.S. PATENT DOCUMENTS

| | | | |
|---|---|---|---|
| 2019/0026073 A1* | 1/2019 | Kim | H04M 1/72415 |
| 2019/0037378 A1* | 1/2019 | Xia | H04L 12/2807 |

(Continued)

FOREIGN PATENT DOCUMENTS

| | | |
|---|---|---|
| CN | 111343202 A | 6/2020 |
| CN | 111432410 A | 7/2020 |

OTHER PUBLICATIONS

Arulmozhi et al. Device to Cloud (D2C) Integration for Automated Device Management, IEEE, Aug. 18, 2018, pp. 166-172. (Year: 2018).*

(Continued)

*Primary Examiner* — Philip J Chea
*Assistant Examiner* — Jenise E Jackson

(57) ABSTRACT

Provided are a cloud platform binding method and system for an Internet of Things card, and a device and a medium. The method comprises: in response to a device online instruction, acquiring a login message and device identification information and sending to an Internet of Things server; if they pass the verification of the Internet of Things server, loading a preset PGW network element configuration first-level script, and pushing acquired card information to the Internet of Things server; receiving a cloud object storage address which corresponds to the card information; if a data uploading request is detected, loading a preset PGW network element configuration second-level script, and sending the cloud object storage address to the Internet of Things server for legitimacy verification; and if it passes the legitimacy verification, sending the card information and (Continued)

acquired device data to the Internet of Things server. An automatic cloud-card binding function is realized.

6 Claims, 5 Drawing Sheets

(56) References Cited

U.S. PATENT DOCUMENTS

2020/0304563 A1* 9/2020 Cheng ................ H04L 67/10
2023/0040580 A1* 2/2023 Yuan ................ H04L 67/12

OTHER PUBLICATIONS

Nandy et al., Review on Security of Internet of Things Authentication Mechanism, IEEE, Oct. 16, 2019, pp. 151054-151089. (Year: 2019).*

International Search Report of PCT Patent Application No. PCT/CN2021/141154 issued on Apr. 27, 2022.

* cited by examiner

Internet of Things terminal           Internet of Things server ated on and claims the priority

CLOUD PLATFORM BINDING METHOD AND SYSTEM FOR INTERNET OF THINGS CARD, AND DEVICE AND MEDIUM

The present application is based on and claims the priority of the Chinese patent application with the application No. 202111174913.1 and the filing date of Oct. 9, 2021, which is incorporated herein for reference in its entirety.

TECHNICAL FIELD

The present application relates to the technical field of an Internet of Things terminal, and more particularly to a cloud platform binding method and system for an Internet of Things card, and an Internet of Things device and a storage medium.

BACKGROUND ART

With the rapid development of the Internet of Things industry, more and more devices constitute interconnected networks. The Internet of Things (IoT) is a thing-to-thing interconnection network, which integrates sensing technology, network communication technology and cloud computing technology to connect controllers, sensors and people to create an intelligent network. Therefore, Internet of Things cards with communication advantages and cloud computing capabilities with efficient storage computing capabilities are the two core parts of Internet of Things.

An existing terminal device storing data to a cloud server via a network often requires the following process: after a device equipped with an Internet of Things card sends a device reporting message, a device access module forwards same to a device management module according to an identification number of the device and a network protocol, and the device management module performs device identity authentication and device information query, and returns device authentication passing information after security authentication is completed. Device data is uploaded to a device management platform after device authentication is passed, and the platform forwards the data to a cloud object storage according to a cloud storage service subscribed by a device user.

In the above-mentioned solution, a device carrying an Internet of Things card needs to store data into a cloud service, and a plurality of processes, such as an Internet of Things card module, a device access module, a device management module, a subscription module and a cloud storage module are needed, and the binding between an Internet of Things card and a cloud resource can be effectively completed through the management of a plurality of processes. Each process also requires identity authentication to proceed to the next step. If the inter-module interface message is lost or the device management processing is abnormal, the binding between the Internet of Things card and the cloud resources will be invalid, the cloud card will not be able to intercommunicate and the data will not be uploaded, and the efficiency of uploading data by the device will be reduced. At the same time, the independent monitoring and modular isolation of each module lead to card cloud isolation, which cannot form a unified card flow and cloud flow monitoring, and cannot form a unified cloud card flow service development and expense settlement.

SUMMARY OF THE INVENTION

Provided in an embodiment of the present application is a cloud platform binding method, system for an Internet of Things card, and an Internet of Things device and a storage medium, aiming at solving the problems in the prior art that a device carrying an Internet of Things card needs to store data into a cloud service, and a binding between an Internet of Things card and a cloud resource can be effectively completed through the management of multiple processes, and if the inter-module interface message is lost or the device management processing is abnormal, the binding between the Internet of Things card and the cloud resources will be invalid, the cloud card will not be able to intercommunicate and the data will not be uploaded, and the efficiency of uploading data by the device will be reduced.

In a first aspect, provided in an embodiment of the present application is a cloud platform binding method for an Internet of Things card and applied to an Internet of Things terminal, including:

acquiring, in response to a device online instruction, a login message and device identification information which correspond to the device online instruction, and sending the login message and the device identification information to an Internet of Things server;

if it is determined that the login message and the device identification information pass verification of the Internet of Things server, loading a preset PGW network element configuration first-level script, and pushing the acquired card information to the Internet of Things server;

receiving a cloud object storage address which corresponds to the card information;

if a data uploading request is detected, loading a preset PGW network element configuration second-level script, and sending the cloud object storage address to the Internet of Things server for legitimacy verification; and if the cloud object storage address passes the legitimacy verification, sending the card information and the acquired device data to the Internet of Things server.

In a second aspect, provided in an embodiment of the present application is a cloud platform binding method for an Internet of Things card and applied to an Internet of Things server, including:

receiving a login message and device identification information sent by an Internet of Things terminal, acquiring a key state of a cloud key according to the login message and the device identification information, and if it is determined that the key state is an online state, sending information that the login message and the device identification information pass verification to the Internet of Things terminal;

receiving the card information sent by the Internet of Things terminal, performing one-to-one mapping binding on the cloud key and the card information, and generating a cloud object storage address which corresponds to the card information; where the cloud object storage address and the cloud key are in a one-to-one mapping binding relationship, and the cloud object storage address includes a storage folder name and a data storage request address;

sending the cloud object storage address to the Internet of Things terminal;

if a cloud object storage request of the Internet of Things terminal is detected, acquiring a current cloud object storage address and Internet of Things card information about the cloud object storage request;

if the current cloud object storage address passes the verification of the cloud key, notification information that the current cloud object storage address passes the legitimacy verification is sent to the Internet of Things terminal; and receiving card information and device data sent by the Internet of Things terminal according to the current cloud object storage address.

In a third aspect, provided in an embodiment of the present application is a cloud platform binding system for an Internet of Things card, including an Internet of Things server and at least one Internet of Things terminal, where the Internet of Things terminal is used for executing the cloud platform binding method for an Internet of Things card according to the first aspect, and the Internet of Things server is used for executing the cloud platform binding method for an Internet of Things card according to the second aspect.

In a fourth aspect, further provided in an embodiment of the present application is an Internet of Things device including a memory, a processor and a computer program stored on the memory and operable on the processor, the processor, when executing the computer program, implements the cloud platform binding method for an Internet of Things card of the first aspect described above or implements the cloud platform binding method for an Internet of Things card of the second aspect described above.

In a fourth aspect, provided in an embodiment of the present application is a computer-readable storage medium, where the computer-readable storage medium stores a computer program which, when executed by a processor, causes the processor to execute the cloud platform binding method for the Internet of Things card according to the first aspect or to execute the cloud platform binding method for the Internet of Things card according to the second aspect.

Provided in an embodiment of the present application are a cloud platform binding method and system for an Internet of Things card, and a device and a storage medium. The method includes: acquiring, in response to a device online instruction, a login message and device identification information which correspond to the device online instruction, and sending the login message and the device identification information to an Internet of Things server; if it is determined that the login message and the device identification information pass verification of the Internet of Things server, loading a preset PGW network element configuration first-level script, and pushing acquired card information to the Internet of Things server; receiving a cloud object storage address which corresponds to the card information; if a data uploading request is detected, loading a preset PGW network element configuration second-level script, and sending the cloud object storage address to the Internet of Things server for legitimacy verification; and if the cloud object storage address passes the legitimacy verification, sending the card information and acquired device data to the Internet of Things server. Quick card-cloud binding is realized, a link of forwarding device data to a cloud object storage is omitted, and an automatic cloud-card binding function is realized.

BRIEF DESCRIPTION OF THE DRAWINGS

In order to illustrate the technical solutions of the embodiments of the present application more clearly, the drawings required to be used in the description of the embodiments are briefly introduced below, and it is obvious that the drawings in the description below are some embodiments of the present application, and it is obvious for a person skilled in the art to obtain other drawings based on the drawings without creative efforts.

DETAILED DESCRIPTION OF THE INVENTION

The embodiments of the present application will now be described more fully hereinafter with reference to the accompanying drawings, in which embodiments of the present application are shown. It is to be appreciated that the embodiments described are a few, but not all embodiments of the present application. Based on the embodiments of the present application, all other embodiments obtained by a person skilled in the art without involving any inventive effort fall within the scope of protection of the Invention.

It will be appreciated that the terms "include" and "contain", when used in this description and the appended claims, specify the presence of stated features, integers, steps, operations, elements, and/or components, but do not preclude the presence or addition of one or more other features, integers, steps, operations, elements, components, and/or groups thereof.

It is also to be appreciated that the terminology used in the description of the present application herein is for the purpose of describing particular embodiments only and is not intended to be limiting of the present application. As used in the description of the present application and the appended claims, the singular forms "a", "an", and "the" are intended to include the plural forms as well, unless the context clearly indicates otherwise.

It should be further appreciated that the term "and/or" as used in the description and the appended claims refers to and includes any and all possible combinations of one or more of the associated listed items.

Figure 1:
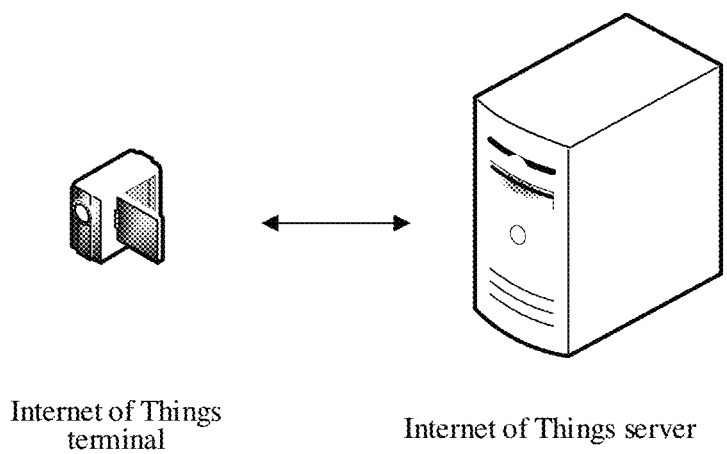
FIG. 1 is a schematic diagram showing an application scenario of a cloud platform binding method for an Internet of Things card according to an embodiment of the present application.
Figure 2:
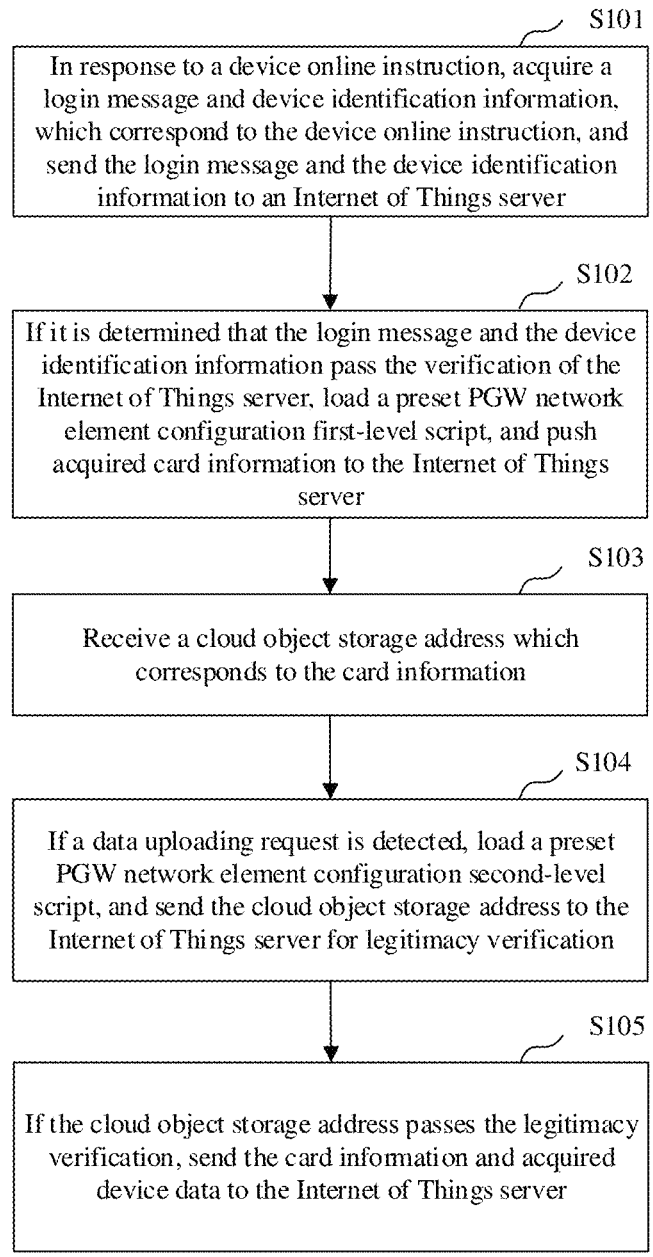
FIG. 2 is a flow diagram showing a cloud platform binding method for an Internet of Things card according to an embodiment of the present application.

Reference is made to FIGS. 1 and 2, FIG. 1 is a schematic diagram showing an application scenario of a cloud platform binding method for an Internet of Things card according to an embodiment of the present application; FIG. 2 is a flow diagram showing a cloud platform binding method for an Internet of Things card applied to an Internet of Things terminal according to an embodiment of the present application, the method being performed by an application software installed in the Internet of Things terminal.

As shown in FIG. 2, the method includes steps S101 to S105.

S101 Acquire, in response to a device online instruction, a login message and device identification information which correspond to the device online instruction, and send the login message and the device identification information to an Internet of Things server.

In the present embodiment, the technical solution is first described by taking an Internet of Things terminal as an executive body. When an Internet of Things terminal (e.g., an Internet of Things terminal can be known as a device into which an Internet of Things card is inserted) is online, a device online instruction is triggered to be generated. In response to a device online instruction, a login message and device identification information which correspond to the device online instruction are firstly acquired by an Internet of Things terminal, and the login message and the device identification information are sent to an Internet of Things server. In this way, device online notification for the Internet of Things server is achieved.

S102 If it is determined that the login message and the device identification information pass verification of the Internet of Things server, load a preset PGW network element configuration first-level script, and push the acquired card information to the Internet of Things server.

In the present embodiment, after the Internet of Things terminal sends the login message and the device identification information to the Internet of Things server, the Internet of Things server performs device authorization authentication thereon to realize device login verification. When it is determined that the login message and the device identification information pass verification of the Internet of Things server, it is indicated that the login of the Internet of Things terminal is legal, and the device authorization authentication can be completed for successful login.

Then a preset PGW network element configuration first-level script can be loaded, and the Internet of Things terminal sends a cloud card binding request to the Internet of Things server to push information, such as card information, of the Internet of Things terminal to the Internet of Things server.

In one embodiment, Step S102 includes:
PDN gateway information is acquired via the loaded PGW network element configuration first-level script; and
the acquired card information is sent to an Internet of Things server according to the PDN gateway information.

In the present embodiment, a full name of the PGW in the PGW network element configuration first-level script is PDN GateWay, representing a PDN gateway, and the PGW network element is an important network element in a mobile communication network EPC. The Internet of Things terminal can automatically acquire PDN gateway information by pre-loading a PGW network element configuration first-level script, and then performs a communication connection with the Internet of Things server based on the PDN gateway information, and finally card information acquired by the Internet of Things terminal can be sent to the Internet of Things server according to the PDN gateway information.

S103 Receive a cloud object storage address which corresponds to the card information.

In the present embodiment, after the Internet of Things terminal uploads the card information to the Internet of Things server, in order to achieve rapid card cloud binding, the Internet of Things terminal receives a cloud object storage address which corresponds to the card information sent by the Internet of Things server. The cloud object storage address performs one-to-one binding with the card information, and such one-to-one binding information is stored in the Internet of Things server. When the card cloud binding is completed, the Internet of Things terminal can write data into the cloud object storage according to the cloud object storage address.

S104 If a data uploading request is detected, load a preset PGW network element configuration second-level script, and send the cloud object storage address to the Internet of Things server for legitimacy verification.

In the present embodiment, if the Internet of Things terminal needs to upload data to the Internet of Things server when in an online state, a data uploading request will be triggered to be generated, and at this time, a preset PGW network element configuration second-level script is loaded first to trigger the initiation of an access request to the Internet of Things server, and then a cloud object storage address access request acquired by loading the PGW network element configuration second-level script is sent to the Internet of Things server for legitimacy verification.

In one embodiment, Step S104 includes:
an HTTP request is generated from the acquired cloud object storage address and the encrypted Internet of Things card information via the loaded PGW network element configuration second-level script, and the HTTP request is sent to the Internet of Things server for legitimacy verification; where a message header of the HTTP request is encrypted Internet of Things card information.

In the present embodiment, the function of the PGW network element configuration first-level script is to acquire PDN gateway information, and the function of the PGW network element configuration second-level script is to acquire a cloud object storage address and encrypted Internet of Things card information to generate an HTTP request, and it can be seen that the functions of the two scripts are different. An HTTP request is generated from the acquired cloud object storage address and the encrypted Internet of Things card information via the loaded PGW network element configuration second-level script, and the HTTP request is sent to an Internet of Things server for legitimacy verification. In the process of generating an HTTP request based on a cloud object storage address and encrypted Internet of Things card information, the encrypted Internet of Things card information is taken as a message header, and the cloud object storage address is taken as a message body.

More specifically, the PGW network element configuration first-level script achieves card information configuration when a card cloud binding request is performed, and the PGW network element configuration second-level script achieves card information configuration when card data is stored in a cloud object storage. A header enhancement script is configured on an address network request header according to a specific http request address, the encrypted Internet of Things card information is configured in the HTTP Header message header to realize the function of configuring and transferring card information.

S105 If the cloud object storage address passes the legitimacy verification, send the card information and the acquired device data to the Internet of Things server.

In the present embodiment, when the physical network server verifies the legitimacy of the cloud object storage address and passes the verification, it is indicated that the Internet of Things terminal can upload data to the Internet of Things server for storage. Specifically, according to the cloud object storage address, the Internet of Things terminal sends the card information and the acquired device data to a storage area corresponding to the cloud object storage address in the Internet of Things server to complete a data uploading process.

Figure 3:
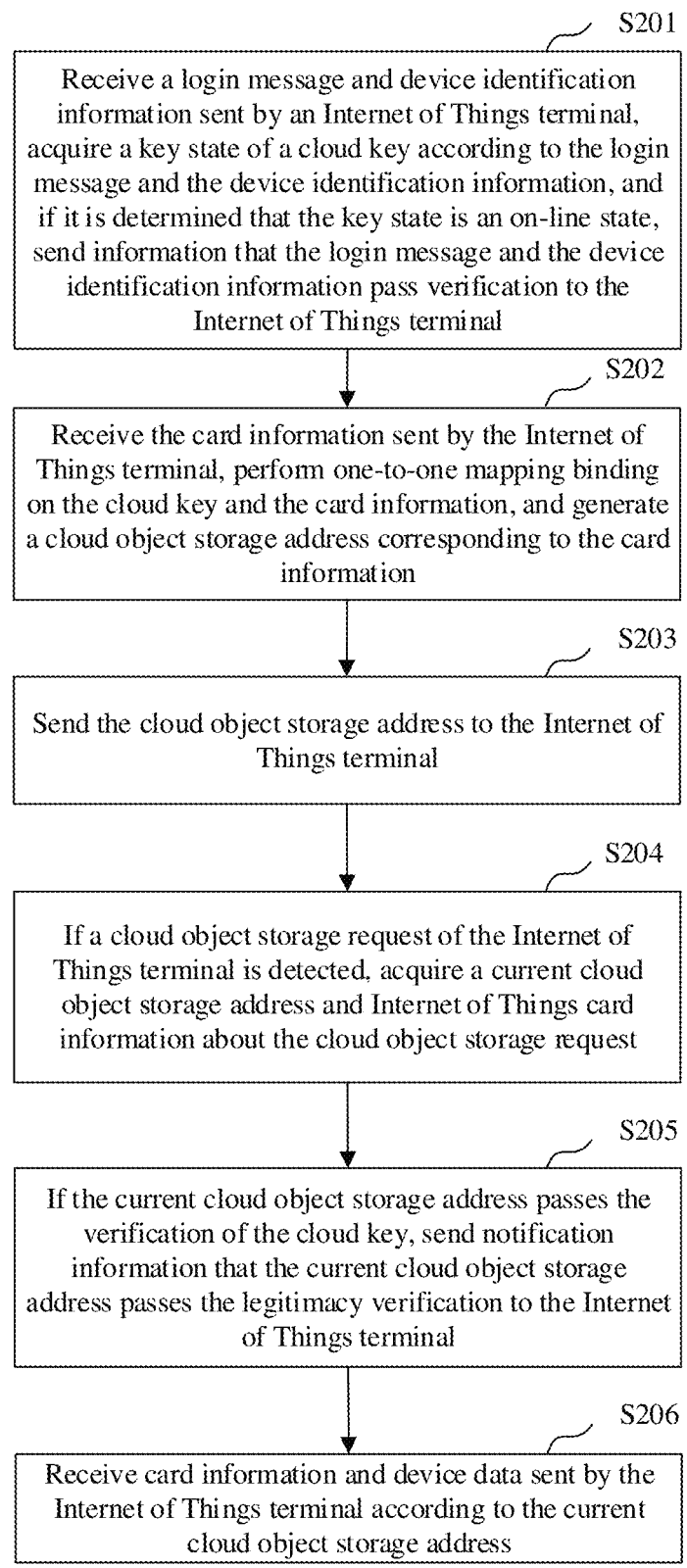
FIG. 3 is another flow diagram showing a cloud platform binding method for an Internet of Things card according to an embodiment of the present application.

Reference is made to FIGS. 1 and 3, FIG. 3 is another flow diagram showing a cloud platform binding method for an Internet of Things card according to an embodiment of the present application, where the cloud platform binding method for the Internet of Things card is applied to an Internet of Things server (the Internet of Things server can also be appreciated as an Internet of Things cloud platform), and the method is performed by an application software installed in the Internet of Things server.

As shown in FIG. 3, the method includes Steps S201 to S206.

S201 Receive a login message and device identification information sent by an Internet of Things terminal, acquire a key state of a cloud key according to the login message and the device identification information, and if it is determined that the key state is an online state, send information that the login message and the device identification information pass verification to the Internet of Things terminal.

In the present embodiment, the technical solution is then described with an Internet of Things server as an executive body. After the login message and device identification information are sent during the online process of the Internet of Things terminal, a unified key authentication sub-module in the Internet of Things server acquires key information to verify whether the login is legal through a cloud key dictionary to realize the authentication of authorized login of a device.

Specifically, after receiving the login message and device identification information about an Internet of Things terminal, the unified key authentication sub-module firstly requests the cloud key dictionary, and according to the device identification information, the cloud key dictionary queries a key state, where the key state is divided into online, invalid and frozen states, and if the key state is online, the login is legal, and unified key identity authentication is completed; and a device login verification result is returned, and device authorization authentication is completed. If it is determined that the key state is an online state, it is determined that the login of the Internet of Things terminal is legal.

The unified key authentication sub-module has a real-time query management function for user key information; the key is generated by means of cloud platform generation, and the key is synchronized to the unified key authentication sub-module; and the unified key authentication sub-module is responsible for managing three real-time states (online, invalid or frozen) of the key. After the Internet of Things terminal sends the login authentication request, the unified key authentication sub-module obtains whether the key information for verifying the login is legal through the cloud key dictionary, and completes the authorized login authentication of the device. At the same time, the unified key authentication sub-module performs legitimacy verification according to the key in the request address according to the device request address, including device login verification, device card cloud binding request legitimacy verification, and legitimacy verification for writing device data into cloud, and prohibits the access of the http request if it is illegal. Device request management and authentication are performed through security authorization authentication at the key level.

S202 Receive the card information sent by the Internet of Things terminal, perform one-to-one mapping binding on the cloud key and the card information, and generate a cloud object storage address which corresponds to the card information; where the cloud object storage address and the cloud key are in a one-to-one mapping binding relationship, and the cloud object storage address includes a storage folder name and a data storage request address.

In the present embodiment, after the Internet of Things server completes the online authentication of the Internet of Things terminal, when the Internet of Things terminal needs to upload data to the Internet of Things server for storage, the card cloud binding also needs to be realized. That is to say, the cloud key sub-module in the Internet of Things server first receives the card information sent by the Internet of Things terminal, then the cloud key dictionary is loaded by the cloud key sub-module, the card information is stored in the cloud key dictionary, and association binding between the card and the cloud key is performed, and the binding relationship can be one-to-many. At the same time, the cloud key sub-module generates a cloud object storage address which corresponds to the card information according to the cloud key dictionary and the card relationship.

In one embodiment, Step S202 includes:
a cloud key dictionary is acquired;
the card information is stored into the cloud key dictionary, and one-to-one mapping binding is performed on the cloud key and the card information; and
a storage folder name and a cloud data storage resource bucket list corresponding to the storage folder name are generated, and a data storage request address is generated to constitute a cloud object storage address.

In the present embodiment, the cloud object storage address generated by the cloud key sub-module includes a cloud data storage resource bucket list and a data storage request address, where there is a one-to-one relationship between the storage folder name corresponding to the cloud data storage resource bucket list (i.e., PutBuketService) and the data storage request address, thereby completing the relationship rule establishment and dictionary generation of one card, one cloud key and one storage resource address.

The cloud key sub-module is used for realizing the relationship binding of one card, one cloud key and one storage resource address, storing the cloud object storage key and card information, and at the same time performing core configuration of which card the cloud object storage resource is allocated to. The cloud key sub-module has a key management capability to manage and maintain keys. At the same time, the cloud key sub-module has a cloud resource configuration capability, and can establish and maintain a cloud resource storage address. In addition, it has the card information read-write capability, and can read the header information carried by the PGW script while configuring the card information into the cloud key dictionary. A security key AK/SK is configured via a cloud key dictionary, a bucket name and address and a card information mapping rule for the cloud object storage are used to realize a key link of card cloud binding to generate a message to push an HTTP request address required by cloud storage, and to realize action configuration of data forwarding to the object storage.

S203 Send the cloud object storage address to the Internet of Things terminal.

In the present embodiment, when card cloud binding is completed in the Internet of Things server, the cloud object storage address is returned to the Internet of Things terminal for uploading data.

S204 If a cloud object storage request of the Internet of Things terminal is detected, acquire a current cloud object storage address and Internet of Things card information about the cloud object storage request.

In the present embodiment, after card cloud binding is completed in the Internet of Things server, if a cloud object storage request of the Internet of Things terminal is detected, it is indicated that the Internet of Things terminal needs to upload data to the Internet of Things server for storage. At this time, firstly a current cloud object storage address and Internet of Things card information about the cloud object storage request are acquired, and then permission verification is performed during data storage based on the current cloud object storage address and Internet of Things card information.

In an embodiment, after Step S204 and before Step S205, the following is included:

a cloud key dictionary is loaded, and the current cloud object storage address is verified via the cloud key dictionary.

In the present embodiment, a cloud resource storage address can be established and maintained by the loaded cloud key dictionary having cloud resource configuration capability. In addition, it has the card information read-write capability, and can read the header information carried by the PGW script while configuring the card information into the cloud key dictionary. Specifically, the current cloud object storage address can be quickly verified via the cloud key dictionary.

S205 If the current cloud object storage address passes the verification of the cloud key, notification information that the current cloud object storage address passes the legitimacy verification is sent to the Internet of Things terminal.

In the present embodiment, after the current cloud object storage address can be quickly verified via the cloud key dictionary, notification information about the current cloud object storage address passing legitimacy verification can be sent to an Internet of Things terminal, so that data uploaded after the Internet of Things terminal can be received for storage.

S206 Receive card information and device data sent by the Internet of Things terminal according to the current cloud object storage address.

In the present embodiment, after card cloud binding is completed, the Internet of Things server can also achieve the monitoring function of Internet of Things card flow information and cloud object storage resource flow, that is to say, monitoring the cloud object storage resource flow can be performed according to the received card information and device data sent by the Internet of Things terminal according to the current cloud object storage address. Use of the flow of cloud resources (also using an Internet of Things server) by a card is checked and updated in real time via an Internet of Things card flow interface and a cloud object storage interface, and at the same time unified flow statistics and unified settlement are provided in a monthly balance manner.

For example, an enterprise confirms access for millions of Internet of Things cards for cellular camera production. The image or video data generated by the camera in use is uploaded to the cloud object storage through the Internet of Things card for bearing. By implementing the technical solution of the present application, a channel between an Internet of Things card and cloud object storage is opened, so that device data is securely and reliably transmitted to the cloud. At the same time, a customer querying the usage amount of cloud object storage corresponding to different Internet of Things cards can be provided to monitor Internet of Things card and cloud object storage flow, and monitor the normal load condition of card and cloud for daily operation. At the same time, the unified monthly expense of customers is provided to realize the unified expansion and expense settlement of card and cloud resource flow.

It can be seen that the present application is based on a method for unifying key security authentication and enhanced configuration of a PGW network element head at a network side of a two-level Internet of Things card, and when a user logs in a message, according to a cloud key dictionary, the legitimacy of the Internet of Things terminal login is verified to complete the online authentication of the Internet of Things terminal; after the Internet of Things terminal is successfully online, the Internet of Things terminal sends a cloud card binding request address, loads a preset PGW network element configuration first-level script, and pushes card information to the cloud key sub-module. After acquiring the card information, the cloud key sub-module loads the cloud key dictionary, stores the card information into the cloud key dictionary, and performs association binding between the card and the cloud key. At the same time, the cloud key sub-module completes the generation of a cloud data storage resource folder name and a data storage request address according to a cloud key dictionary relationship, and completes relationship binding of one card, one cloud key and one storage resource address, and at the same time returns the address to the Internet of Things terminal to upload data.

After acquiring the data storage request address, the Internet of Things terminal loads a preset PGW network element configuration second-level script, and the cloud key sub-module verifies the legitimacy of the request address according to the cloud key dictionary, and if it is legal, the verification is passed, and the device data is stored in the cloud resource. By means of the technical solution of the present application, integrating and binding a cloud, an Internet of Things card and a terminal hardware device is realized, thereby implementing a device terminal having a cloud object storage capability. By implementing the technical solution of the present application, the problems existing in the cards and cloud isolation method can be solved, and the link of forwarding the device data to the cloud object storage can be reduced, thereby achieving an automatic cloud-card binding function. It can also realize the unified monitoring of flow usage amount of the Internet of Things card and usage amount of the cloud object storage, and can real-time monitor card flow and cloud resource usage to realize the promotion and expense settlement of cloud card-related flow services, etc. At the same time, after passing through the cloud key sub-module, the device equipped with the Internet of Things card achieves unified identity authentication, the key performs card information maintenance and interface legitimacy verification to increase data storage security, so that data is stored in the cloud more safely and reliably, realizing efficient direct data access to cloud and cloud information intercommunication, centralized management and efficient calculation, and improving reliability.

By means of the method, quick card-cloud binding is realized, a link of forwarding device data to a cloud object storage is omitted, and an automatic cloud-card binding function is realized.

Further provided in an embodiment of the present application is a cloud platform binding system for an Internet of Things card, which is used for executing any of the embodiments of the above-mentioned cloud platform binding method for the Internet of Things card with the Internet of Things terminal as an executive body, or for executing any of the embodiments of the above-mentioned cloud platform binding method for an Internet of Things card with an Internet of Things server as an executive subject. Specifically, reference is made to FIG. 4, which is a schematic block diagram showing a cloud platform binding system 10 for an Internet of Things card according to an embodiment of the present application.

Figure 4:
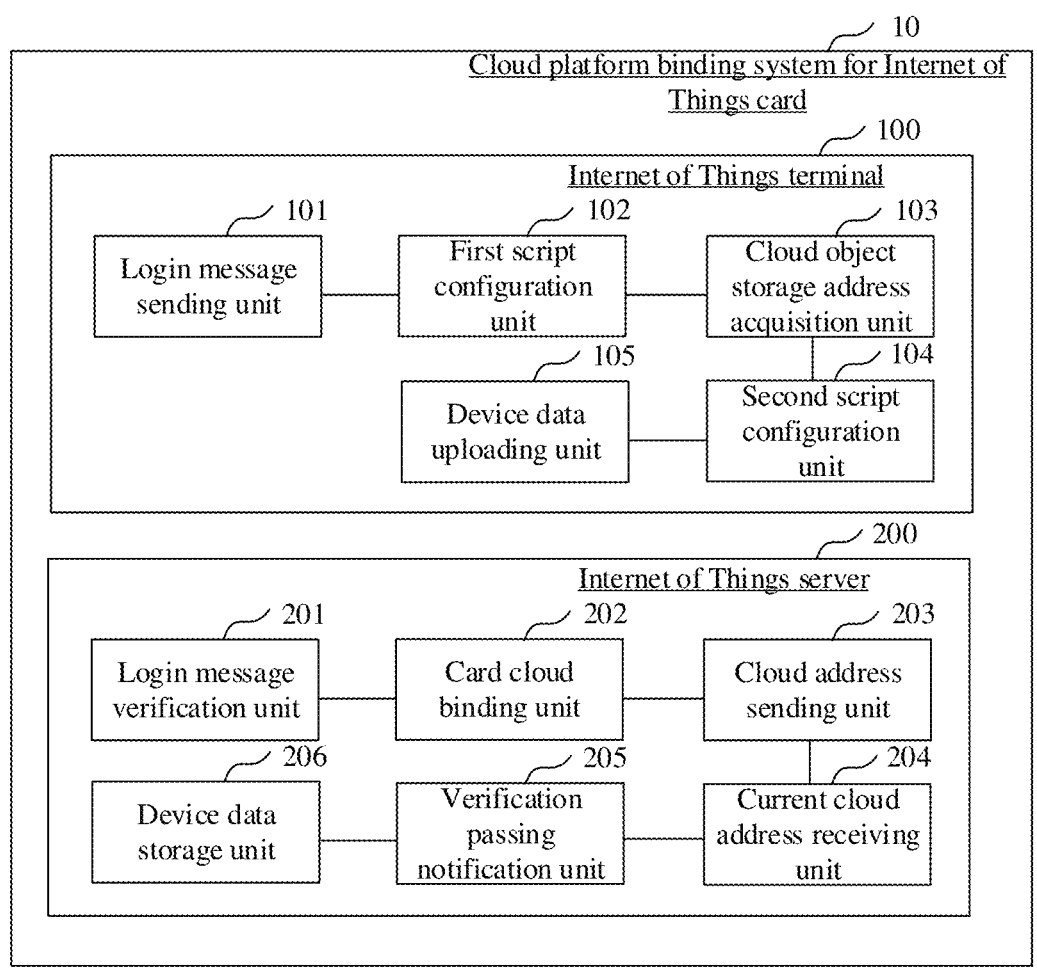
FIG. 4 is a schematic block diagram showing a cloud platform binding system for an Internet of Things card according to an embodiment of the present application.

As shown in FIG. 4, the cloud platform binding system 10 for an Internet of Things card includes an Internet of Things terminal 100 and an Internet of Things server 200.

As shown in FIG. 4, the Internet of Things terminal 100 includes: a login message sending unit 101, a first script configuration unit 102, a cloud object storage address acquisition unit 103, a second script configuration unit 104 and a device data uploading unit 105.

A login message sending unit 101 configured to acquire, in response to a device online instruction, a login message and device identification information which correspond to the device online instruction, and send the login message and the device identification information to an Internet of Things server.

In the present embodiment, the technical solution is first described by taking an Internet of Things terminal as an executive body. When an Internet of Things terminal (e.g., an Internet of Things terminal can be appreciated as a device into which an Internet of Things card is inserted) comes online, a device online instruction is triggered to be generated. In response to a device online instruction, a login message and device identification information which correspond to the device online instruction are firstly acquired by an Internet of Things terminal, and the login message and the device identification information are sent to an Internet of Things server. In this way, device online notification for the Internet of Things server is achieved.

A first script configuration unit 102 configured to, if it is determined that the login message and the device identification information pass verification of the Internet of Things server, load a preset PGW network element configuration first-level script, and push the acquired card information to the Internet of Things server.

In the present embodiment, after the Internet of Things terminal sends the login message and the device identification information to the Internet of Things server, the Internet of Things server performs device authorization authentication thereon to realize device login verification. When it is determined that the login message and the device identification information pass verification of the Internet of Things server, it is indicated that the login of the Internet of Things terminal is legal, and the device authorization authentication can be completed for successful login.

Then a preset PGW network element configuration first-level script can be loaded, and the Internet of Things terminal sends a cloud card binding request to the Internet of Things server to push information, such as card information, of the Internet of Things terminal to the Internet of Things server.

In an embodiment, the first script configuration unit 102 includes:
A gateway information acquisition unit configured to acquire PDN gateway information through the loaded PGW network element configuration first-level script;
A communication establishment unit configured to send the acquired card information to an Internet of Things server according to the PDN gateway information.

In the present embodiment, a full name of the PGW in the PGW network element configuration first-level script is PDN GateWay, representing a PDN gateway, and the PGW network element is an important network element in a mobile communication network EPC. The Internet of Things terminal can automatically acquire PDN gateway information by pre-loading a PGW network element configuration first-level script, and then performs a communication connection with the Internet of Things server based on the PDN gateway information, and finally card information acquired by the Internet of Things terminal can be sent to the Internet of Things server according to the PDN gateway information.

A cloud object storage address acquisition unit 103 configured to receive a cloud object storage address which corresponds to the card information.

In the present embodiment, after the Internet of Things terminal uploads the card information to the Internet of Things server, in order to achieve rapid card cloud binding, the Internet of Things terminal receives a cloud object storage address which corresponds to the card information sent by the Internet of Things server. The cloud object storage address performs one-to-one binding with the card information, and such one-to-one binding information is stored in the Internet of Things server. When the card cloud binding is completed, the Internet of Things terminal can write data into the cloud object storage according to the cloud object storage address.

A second script configuration unit 104 configured to, if a data uploading request is detected, load a preset PGW network element configuration second-level script, and send the cloud object storage address to the Internet of Things server for legitimacy verification.

In the present embodiment, if the Internet of Things terminal needs to upload data to the Internet of Things server when in an online state, a data uploading request will be triggered to be generated, and at this time, a preset PGW network element configuration second-level script is loaded first to trigger the initiation of an access request to the Internet of Things server, and then a cloud object storage address access request acquired by loading the PGW network element configuration second-level script is sent to the Internet of Things server for legitimacy verification.

In an embodiment, the second script configuration unit 104 is further configured to
generate an HTTP request from the acquired cloud object storage address and the encrypted Internet of Things card information via the loaded PGW network element configuration second-level script, and send the HTTP request to the Internet of Things server for legitimacy verification; where a message header of the HTTP request is encrypted Internet of Things card information.

In the present embodiment, the function of the PGW network element configuration first-level script is to acquire PDN gateway information, and the function of the PGW network element configuration second-level script is to acquire a cloud object storage address and encrypted Internet of Things card information to generate an HTTP request, and it can be seen that the functions of the two scripts are different. An HTTP request is generated from the acquired cloud object storage address and the encrypted Internet of Things card information via the loaded PGW network element configuration second-level script, and the HTTP request is sent to an Internet of Things server for legitimacy verification. In the process of generating an HTTP request based on a cloud object storage address and encrypted Internet of Things card information, the encrypted Internet of Things card information is taken as a message header, and the cloud object storage address is taken as a message body.

More specifically, the PGW network element configuration first-level script achieves card information configuration when a card cloud binding request is performed, and the PGW network element configuration second-level script achieves card information configuration when card data is stored in a cloud object storage. A header enhancement script is configured on an address network request header according to a specific http request address, the encrypted Internet of Things card information is configured in the HTTP Header message header to realize the function of configuring and transferring card information.

A device data uploading unit 105 configured to, if the cloud object storage address passes the legitimacy verification, send the card information and the acquired device data to the Internet of Things server.

In the present embodiment, when the physical network server verifies the legitimacy of the cloud object storage address and passes the verification, it is indicated that the Internet of Things terminal can upload data to the Internet of Things server for storage. Specifically, according to the cloud object storage address, the Internet of Things terminal sends the card information and the acquired device data to a storage area corresponding to the cloud object storage address in the Internet of Things server to complete a data uploading process.

As shown in FIG. 4, the Internet of Things server 200 includes: a login message verification unit 201, a card cloud binding unit 202, a cloud address sending unit 203, a current cloud address receiving unit 204, a verification passing notification unit 205 and a device data storage unit 206.

A login message verification unit 201 configured to receive a login message and device identification information sent by an Internet of Things terminal, acquire a key state of a cloud key according to the login message and the device identification information, and if it is determined that the key state is an online state, send information that the login message and the device identification information pass verification to the Internet of Things terminal.

In the present embodiment, the technical solution is then described with an Internet of Things server as an executive body. After a login message and device identification information are sent during the online process of the Internet of Things terminal, a unified key authentication sub-module in the Internet of Things server acquires key information to verify whether the login is legal through a cloud key dictionary to realize the authentication of authorized login of a device.

Specifically, after receiving a login message and device identification information about an Internet of Things terminal, a unified key authentication sub-module firstly requests a cloud key dictionary, and according to the device identification information, the cloud key dictionary queries a key state, where the key state is divided into online, invalid and frozen states, and if the key state is online, the login is legal, and unified key identity authentication is completed; and a device login verification result is returned, and device authorization authentication is completed. If it is determined that the key state is an online state, it is determined that the login of the Internet of Things terminal is legal.

The unified key authentication sub-module has a real-time query management function for user key information; the key generation is the generation by a cloud platform, and the key is synchronized to the unified key authentication sub-module; and the unified key authentication sub-module is responsible for managing three real-time states (online, invalid or frozen) of the key. After the Internet of Things terminal sends the login authentication request, the unified key authentication sub-module obtains whether the key information for verifying the login is legal through the cloud key dictionary, and completes the authorized login authentication of the device. At the same time, the unified key authentication sub-module performs legitimacy verification according to the key in the request address according to the device request address, including device login verification, device card cloud binding request legitimacy verification, and legitimacy verification for writing device data into cloud, and prohibits the access of the http request if it is illegal. Device request management and authentication are performed through security authorization authentication at the key level.

A card cloud binding unit 202 configured to receive the card information sent by the Internet of Things terminal, perform one-to-one mapping binding on the cloud key and the card information, and generate a cloud object storage address which corresponds to the card information; where the cloud object storage address and the cloud key are in a one-to-one mapping binding relationship, and the cloud object storage address includes a storage folder name and a data storage request address.

In the present embodiment, after the Internet of Things server completes the online authentication of the Internet of Things terminal, when the Internet of Things terminal needs to upload data to the Internet of Things server for storage, the card cloud binding also needs to be realized. That is to say, the cloud key sub-module in the Internet of Things server first receives the card information sent by the Internet of Things terminal, then the cloud key dictionary is loaded by the cloud key sub-module, the card information is stored in the cloud key dictionary, and association binding between the card and the cloud key is performed, and the binding relationship can be one-to-many. At the same time, the cloud key sub-module generates a cloud object storage address which corresponds to the card information according to the cloud key dictionary and the card relationship.

In an embodiment, the card cloud binding unit 202 includes:

a dictionary acquisition unit configured to acquire a cloud key dictionary;

a binding unit configured to store the card information into the cloud key dictionary, and perform one-to-one mapping binding on the cloud key and the card information; and a combination generation unit configured to generate a storage folder name and a cloud data storage resource bucket list corresponding to the storage folder name, and generate a data storage request address to constitute a cloud object storage address.

In the present embodiment, the cloud object storage address generated by the cloud key sub-module includes a cloud data storage resource bucket list and a data storage request address, where there is a one-to-one relationship between the storage folder name corresponding to the cloud data storage resource bucket list (i.e., PutBuketService) and the data storage request address, thereby completing the relationship rule establishment and dictionary generation of one card, one cloud key and one storage resource address.

The cloud key sub-module is used for realizing the relationship binding of one card, one cloud key and one storage resource address, storing the cloud object storage key and card information, and at the same time performing core configuration of which card the cloud object storage resource is allocated to. The cloud key sub-module has a key management capability to manage and maintain keys. At the same time, the cloud key sub-module has a cloud resource configuration capability, and can establish and maintain a cloud resource storage address. In addition, it has the card information read-write capability, and can read the header information carried by the PGW script while configuring the card information into the cloud key dictionary. The security key AK/SK is configured via a cloud key dictionary, a bucket name and address and a card information mapping rule for the cloud object storage are used to realize a key link of card cloud binding to generate a message to push an HTTP request address required by cloud storage, and to realize action configuration of data forwarding to the object storage.

A cloud address sending unit 203 configured to send the cloud object storage address to the Internet of Things terminal.

In the present embodiment, when card cloud binding is completed in the Internet of Things server, the cloud object storage address is returned to the Internet of Things terminal for uploading data.

A current cloud address receiving unit 204 configured to, if a cloud object storage request of the Internet of Things terminal is detected, acquire a current cloud object storage address and Internet of Things card information about the cloud object storage request.

In the present embodiment, after card cloud binding is completed in the Internet of Things server, if a cloud object storage request of the Internet of Things terminal is detected, it is indicated that the Internet of Things terminal needs to upload data to the Internet of Things server for storage. At this time, firstly a current cloud object storage address and Internet of Things card information about the cloud object storage request are acquired, and then permission verification is performed during data storage based on the current cloud object storage address and Internet of Things card information.

In an embodiment, the Internet of Things server 200 further includes:
 a current cloud address verification unit configured to load a cloud key dictionary, and verify a current cloud object storage address via the cloud key dictionary.

In the present embodiment, a cloud resource storage address can be established and maintained by the loaded cloud key dictionary having cloud resource configuration capability. In addition, it has the card information read-write capability, and can read the header information carried by the PGW script while configuring the card information into the cloud key dictionary. Specifically, the current cloud object storage address can be quickly verified via the cloud key dictionary.

A verification passing notification unit 205 configured to, if the current cloud object storage address passes the verification of the cloud key, send notification information that the current cloud object storage address passes the legitimacy verification to the Internet of Things terminal.

In the present embodiment, after the current cloud object storage address can be quickly verified via the cloud key dictionary, notification information about the current cloud object storage address passing legitimacy verification can be sent to an Internet of Things terminal, so that data uploaded after the Internet of Things terminal can be received for storage.

A device data storage unit 206 configured to receive card information and device data sent by the Internet of Things terminal according to the current cloud object storage address.

In the present embodiment, after card cloud binding is completed, the Internet of Things server can also achieve the monitoring function of Internet of Things card flow information and cloud object storage resource flow, that is to say, monitoring the cloud object storage resource flow can be performed according to the received card information and device data sent by the Internet of Things terminal according to the current cloud object storage address. Use of the flow of cloud resources (also using an Internet of Things server) by a card is checked and updated in real time via an Internet of Things card flow interface and a cloud object storage interface, and at the same time unified flow statistics and unified settlement are provided in a monthly balance manner.

By means of the system, quick card-cloud binding is realized, a link of forwarding device data to a cloud object storage is omitted, and an automatic cloud-card binding function is realized.

Figure 5:
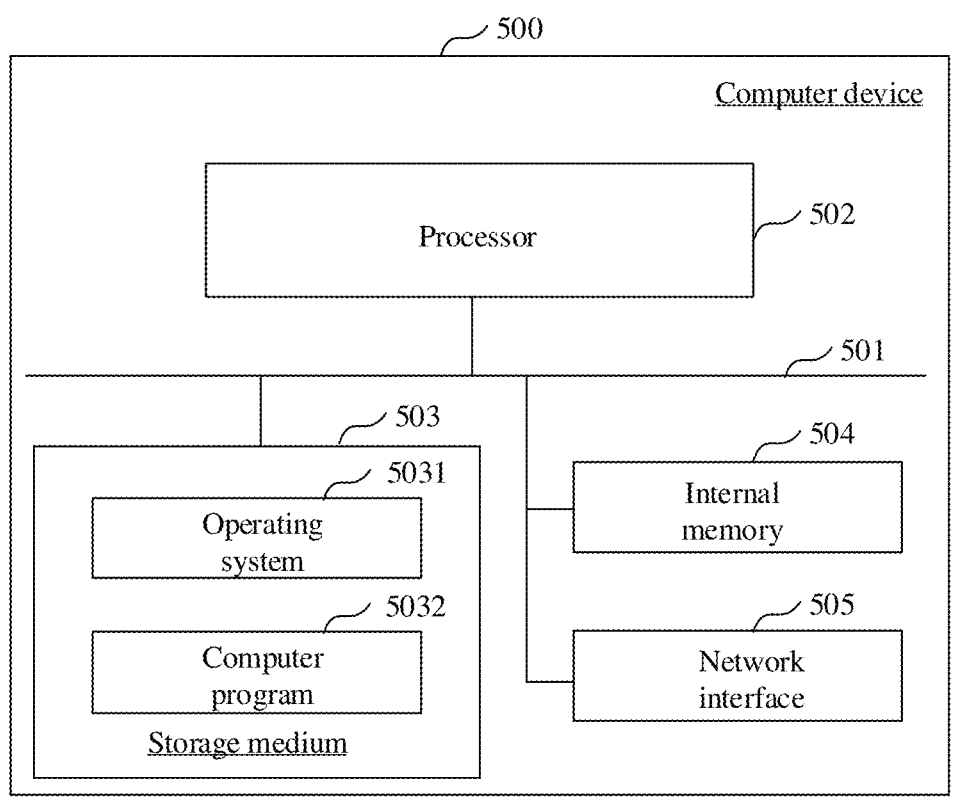
FIG. 5 is a schematic block diagram showing an Internet of Things device according to an embodiment of the present application.

The cloud platform binding system for the Internet of Things card described above can be implemented in the form of a computer program that can run on the Internet of Things device as shown in FIG. 5.

Reference is made to FIG. 5, which is a schematic block diagram showing an Internet of Things device according to an embodiment of the present application. The Internet of Things device 500 is an Internet of Things server, and also be an Internet of Things terminal.

Reference is made to FIG. 5, the Internet of Things device 500 includes a processor 502, a memory which may include a storage medium 503 and an internal memory 504, and a network interface 505 connected via an apparatus bus 501.

The storage medium 503 may store an operating device 5031 and a computer program 5032. The computer program 5032, when executed, may cause the processor 502 to execute a cloud platform binding method for an Internet of Things card.

The processor 502 is configured to provide computing and control capabilities to support the operation of the entire Internet of Things device 500.

The internal memory 504 provides an environment for the operation of the computer program 5032 in the storage medium 503, and when the computer program 5032 is executed by the processor 502, the processor 502 can be made to execute a cloud platform binding method for an Internet of Things card.

The network interface 505 is used for network communication, such as the transmission of data information, etc. A person skilled in the art would appreciate that the structure shown in FIG. 5 is merely a block diagram showing a portion of the structure relevant to the inventive arrangements and does not constitute a limitation on the Internet of Things device 500 to which the inventive arrangements may be applied, and that a particular Internet of Things device 500 may include more or less components than those shown in the figures, or combine certain components, or have a different arrangement of components.

The processor 502 is configured to operate a computer program 5032 stored in a memory to implement the cloud platform binding method for an Internet of Things card disclosed in an embodiment of the present application.

It will be appreciated by a person skilled in the art that the embodiment of the Internet of Things device shown in FIG. 5 does not constitute a limitation on the specific constitution of the Internet of Things device, and in other embodiments, the Internet of Things device may include more or less components than those shown, or combine some components, or have a different arrangement of components. For example, in some embodiments, the Internet of Things device may include only a memory and a processor, and in such embodiments, the structure and function of the memory and the processor are consistent with the embodiment shown in FIG. 5, and will not be described in detail herein.

It should be appreciated that, in the embodiment of the present application, the Processor 502 may be a Central Processing Unit (CPU), and the Processor 502 may also be other general-purpose processors, Digital Signal Processors (DSPs), Application Specific Integrated Circuits (ASICs), Field-Programmable Gate arrays (FPGAs) or other Programmable logic devices, discrete gate or transistor logic devices, discrete hardware components, etc. A general-purpose processor may be a microprocessor, but in the alternative, the processor may be any conventional processor.

In another embodiment of the present application, a computer-readable storage medium is provided. The computer-readable storage medium can be a non-volatile computer-readable storage medium or a volatile computer-readable storage medium. The computer-readable storage medium stores a computer program which, when executed by a processor, implements the cloud platform binding method for the Internet of Things card disclosed in the embodiments of the present application.

It will be clear to a person skilled in the art that, for the convenience and brevity of the description, specific working procedures of the above-described devices, apparatuses and units may be referred to corresponding procedures in the preceding method embodiments and will not be described in detail here. A person skilled in the art will appreciate that the various illustrative components and algorithm steps described in connection with the embodiments disclosed herein may be implemented as electronic hardware, computer software, or combinations of both, and that the components and steps of the various examples have been described above generally in terms of their functionality in order to clearly illustrate this interchangeability of hardware and software. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present application.

In the several embodiments provided in the present application, it should be appreciated that the disclosed apparatus, device and method may be implemented in other manners. For example, the above-described device embodiments are merely illustrative, and for example, the division of the units is only a logical division, and there may be another division in actual implementation, and units having the same function may be grouped into one unit, for example, multiple units or components may be combined or may be integrated into another device, or some features may be omitted, or not executed. In addition, the shown or discussed mutual coupling or direct coupling or communication connection may be an indirect coupling or communication connection through some interfaces, devices or units, and may also be an electrical, mechanical or other form of connection.

The elements described as separate elements may or may not be physically separated, the elements shown as elements may or may not be physical elements, i.e. may be located in one place, or may be distributed over a plurality of network elements. Some or all of the units can be selected according to actual needs to achieve the purpose of the solution of the embodiments of the present application.

In addition, functional units in the embodiments of the present application may be integrated into one processing unit, or each unit may exist alone physically, or two or more units are integrated into one unit. The above-mentioned integrated units may be implemented in the form of hardware or in the form of software functional units.

The integrated unit, if implemented in the form of a software functional unit and sold or used as a separate product, may be stored in a storage medium. Based on such understanding, the technical solution of the present application essentially or partly contributes to the prior art, or all or part of the technical solution may be embodied in the form of a software product, which is stored in a storage medium and includes several instructions for enabling a device of the Internet of Things (which may be a personal computer, a background server, or a network device, etc.) to perform all or part of the steps of the method according to the embodiments of the present application. And the aforementioned storage medium includes: a U-disk, a removable hard disk, a Read-Only Memory (ROM), a magnetic disk, or an optical disk, and various media capable of storing program codes.

While the present application has been described with reference to specific embodiments, it will be appreciated by a person skilled in the art that various changes in form and details may be made therein without departing from the spirit and scope of the present application. Therefore, the protection scope of the present application shall be subject to the protection scope of the claims.

What is claimed is:

1. A cloud platform binding system for an Internet of Things card, comprising an Internet of Things server and at least one Internet of Things terminal, wherein the Internet of Things terminal is used for executing the steps of:

in response to a device online instruction, acquiring a login message and device identification information, which correspond to the device online instruction, and sending the login message and the device identification information to an Internet of Things server;

if it is determined that the login message and the device identification information pass the verification of the Internet of Things server, loading a preset PGW network element configuration first-level script, and pushing acquired card information to the Internet of Things server;

receiving a cloud object storage address which corresponds to the card information;

if a data uploading request is detected, loading a preset PGW network element configuration second-level script, and sending the cloud object storage address to the Internet of Things server for legitimacy verification; and if the cloud object storage address passes the legitimacy verification, sending the card information and acquired device data to the Internet of Things server; and the Internet of Things server is used for executing the steps of:

receiving a login message and device identification information sent by an Internet of Things terminal, acquiring a key state of a cloud key according to the login message and the device identification information, and if it is determined that the key state is an online state, sending information that the login message and the device identification information pass verification to the Internet of Things terminal;

receiving the card information sent by the Internet of Things terminal, performing one-to-one mapping binding on the cloud key and the card information, and generating a cloud object storage address which corresponds to the card information; wherein the cloud object storage address and the cloud key are in a one-to-one mapping binding relationship, and the cloud object storage address comprises a storage folder name and a data storage request address;

sending the cloud object storage address to the Internet of Things terminal;

if a cloud object storage request of the Internet of Things terminal is detected, acquiring a current cloud object storage address and Internet of Things card information about the cloud object storage request;

if the current cloud object storage address passes the verification of the cloud key, sending notification information that the current cloud object storage address passes the legitimacy verification to the Internet of Things terminal; and receiving card information and device data sent by the Internet of Things terminal according to the current cloud object storage address.

2. The cloud platform binding system for an Internet of Things card according to claim 1, wherein the loading a preset PGW network element configuration first-level script, and pushing acquired card information to the Internet of Things server comprises:

acquiring PDN gateway information via the loaded PGW network element configuration first-level script; and sending the acquired card information to the Internet of Things server according to the PDN gateway information.

3. The cloud platform binding system for an Internet of Things card according to claim 2, wherein the loading a preset PGW network element configuration second-level script, and sending the cloud object storage address to the Internet of Things server for legitimacy verification comprises:

generating an HTTP request from acquired cloud object storage address and encrypted Internet of Things card information via the loaded PGW network element configuration second-level script, and sending the HTTP request to the Internet of Things server for legitimacy verification; wherein a message header of the HTTP request is the encrypted Internet of Things card information.

4. The cloud platform binding system for an Internet of Things card according to claim 1, wherein the key state of the cloud key further comprises an invalid state and a frozen state; and if it is determined that the key state is an online state, it is determined that the login of the Internet of Things terminal is legal.

5. The cloud platform binding method for an Internet of Things card according to claim 1, wherein the receiving card information sent by the Internet of Things terminal, performing one-to-one mapping binding on the cloud key and the card information, and generating a cloud object storage address which corresponds to the card information comprises:

acquiring a cloud key dictionary;

storing the card information into the cloud key dictionary, and performing one-to-one mapping binding on the cloud key and the card information; and generating a storage folder name and a cloud data storage resource bucket list corresponding to the storage folder name, and generating a data storage request address to constitute a cloud object storage address.

6. The cloud platform binding method for an Internet of Things card according to claim 1, wherein before sending notification information that the current cloud object storage address passes the legitimacy verification to the Internet of Things terminal, if the current cloud object storage address passes the verification of the cloud key, the method further comprises:

loading a cloud key dictionary, and verifying the current cloud object storage address via the cloud key dictionary.

* * * * *